Patented Dec. 6, 1932

1,889,825

UNITED STATES PATENT OFFICE

GUMAL FESSEL, OF HALLE-ON-THE-SAALE, GERMANY, ASSIGNOR TO TECHNISCHE CHEMIKALIEN-COMPAGNIE G. M. B. H., OF HALLE-ON-THE-SAALE, GERMANY

MANUFACTURE OF RUBBER GOODS

No Drawing. Application filed November 9, 1927, Serial No. 232,187, and in Germany September 18, 1926.

The invention relates to improvements in conditioning rubber, the ultimate object being to produce high class rubber goods of improved quality in regard to their long lasting resiliency and other anti-ageing properties.

Practitioners in the rubber field have been looking out for a long time for appropriate substances which is incorporated into the rubber would acts as efficient softening and anti-ageing agents. A distillate of wood tar, viz., pine tar oil has been used for this purpose with good results which were attributed to its rich content of creosotes and other phenolic constituents; however the low viscosity of the pine tar oil and the presence of light oils therein considerably impairs its value as a softener.

Furthermore extracts from wood tar obtained by treating the same with inorganic solvents such as soda lye and the like have been used to advantage for conditioning rubber which extracts yield rather pure creosotes; and amongst practitioners the opinion prevailed that the very purity of said creosotes containing practically no other ingredients of the tar was responsible for the improved anti-ageing quality of the rubber goods obtained therewith. But, notwithstanding the fact that the said creosotes have proved to be an appropriate substance from a technical point of view for conditioning rubber the other fact that only relatively small quantities of creosotes are obtained from tar distillates by extraction with soda lye and that these creosotes are rather expensive has prevented their coming into general use in practice.

Various other chemical substances such as hydrochinon, resorcinol, pyrogallic-acid, para-amido phenol etc., have been tried as softeners and anti-ageing agents for rubber, but their costliness bars them from being widely used in practice.

The principal object of this invention is to provide a highly efficient yet inexpensive softening and anti-ageing compound for rubber to be used in the manufacture of vulcanized rubber goods of improved quality in which lasting elasticity is combined with durability and other age resisting properties.

The nature and scope of the invention is outlined in the appended claims and will be more fully understood from the following specification.

As far as the inventor's research work has revealed practitioners in the rubber field paid little or no attention heretofore to those low grade oils—mostly used as a cheap fuel—which are obtained as a by-product in the production of lubricating and kindred oils from tars originating from bituminous tarigenic minerals such as lignite, coal, shale, etc. by washing said tars with alcoholic i. e. organic solvents.

Those low grade oils because of their containing many other compounds of a complex nature besides creosotes have not been considered to possibly be efficient softening and anti-ageing agents in the manufacture of rubber for the very reason that they are rather impure i. e. heterogenous mixtures containing hydroaromatic, hydrocarbons, aromatic hydrocarbons, unsaturated aliphatic hydrocarbons and in addition oxygen, sulfur and other constituents which as to their chemical nature were all too unlike the creosotes.

In the course of his comparative experiments and research work the inventor has found that those very low grade and cheap oils—contrary to expectation—are a very efficient softening and anti-ageing substance when used for conditioning rubber in the manufacture of vulcanized goods. They differ from pine tar oil in that they appear to have a much richer content of active constituents which improve the qualities of the rubber.

According to this invention the improved process of conditioning rubber for the manufacture of vulcanized rubber goods having anti-ageing properties comprises mixing the rubber under treatment with an extract, i. e. residuary oils, obtained by extracting tars originating in the distillation of bituminous minerals such as lignite, coal, shale, etc. by means of water soluble, oxygenic, organic solvents of the aliphatic series, preferably alcohols, and by separating the solvent from the extract.

The extract may be heated to advantage to temperatures of about 150° C. and left to cool to room temperature before being used in the manufacture of vulcanized rubber goods in the manner indicated above.

To wit: It has been found that by heating the extract to temperatures of the specified range and thus extruding lighter oils therefrom which still were retained, the softening and anti-ageing properties of the extract are enhanced.

Moreover the extract concerned, on being heated and getting rid of lighter volatile oils will lose most of its specific odor which may derogate in certain cases the acceptability of the extract as a rubber softening and anti-ageing agent.

Good results have been obtained by adding to the rubber in the mixing mill at a temperature of about 40–50° C., 5–10% of an extract produced by extracting lignite generator tar by means of ethyl alcohol, removing the solvent and lighter oils, having boiling points up to about 150° C. from the extract, the latter then having at a temperature of 30° C. a specific gravity higher than 1 and a viscosity of about 7 "Engler" grades. Instead of adding said extract during the regular compounding operation, it may be mixed with pure rubber so as to form a master batch, and a portion of the latter may be used for the mixings.

Various changes and modifications may be made in the application of the said extracts and their production without substantially deviating from the spirit and the salient ideas of my invention.

A great variety of alcoholic solvents such as methyl alcohol, ethyl alcohol, ethyl acetate, acetone etc. may be used to advantage for the purpose of the invention.

Instead of alcoholic solvents, which are preferably used, other water soluble oxygenic organic solvents including ketones and esters may be used for the purpose concerned; but I make no claim to any of those extracting processes per se except in their application to and combination with the conditioning of rubber for the manufacture of vulcanized rubber goods.

Instead of crude tars obtained from bituminous minerals, tar distillates can be used with equal results.

What I claim is:—

1. The process of conditioning rubber for the manufacture of vulcanized rubber goods which comprises mixing the rubber under treatment with an extract, obtained by extracting tars, originating in the distillation of bituminous minerals, by means of water-soluble, oxygenic, organic solvents of the aliphatic series and by removing the solvent from the extract.

2. The process of conditioning rubber for the manufacture of vulcanized rubber goods which comprises mixing the rubber under treatment with an extract, obtained by extracting tar distillates, originating in the distillation of bituminous minerals, by means of water-soluble, oxygenic, organic solvents of the aliphatic series and by removing the solvent from the extract.

3. The process of conditioning rubber for the manufacture of vulcanized rubber goods which comprises mixing the rubber under treatment with an extract, obtained by extracting tars, originating in the distillation of bituminous minerals, by means of water-soluble, oxygenic, organic solvents of the aliphatic series, by removing the solvent from the extract, heating the latter to about 150° C. and by leaving it to cool to room temperature.

4. The process of conditioning rubber for the manufacture of vulcanized rubber goods which comprises mixing the rubber under treatment with an extract, obtained by extracting tar distillates, originating in the distillation of bituminous minerals, by means of water soluble, oxygenic, organic solvents of the aliphatic series, by removing the solvent from the extract, by heating the latter to about 150° C. and by leaving it to cool to room temperature.

5. As a new article of manufacture rubber containing an extract obtained from tars originating in the distillation of bituminous minerals by means of water soluble, oxygenic, organic solvents of the aliphatic series.

6. As a new article of manufacture rubber containing an extract obtained from tar distillates originating in the distillation of bituminous minerals by means of water soluble, oxygenic, organic solvents, of the aliphatic series.

7. As a new article of manufacture rubber containing an extract obtained from tars originating in the distillation of bituminous minerals by means of water soluble aliphatic alcohols.

8. As a new article of manufacture rubber containing an extract, obtained from tar distillates originating in the distillation of bituminous minerals, by means of water soluble aliphatic alcohols.

9. As a new article of manufacture rubber containing an extract, obtained from tars originating in the distillation of bituminous minerals, by means of water soluble aliphatic ketones.

10. As a new article of manufacture rubber containing an extract, obtained from tar distillates originating in the distillation of bituminous minerals, by means of water soluble aliphatic ketones.

In testimony whereof I have signed my name to this specification.

GUMAL FESSEL.